April 1, 1930. H. V. HANSON 1,752,525
HARNESS
Filed Feb. 2, 1929 2 Sheets-Sheet 1

INVENTOR
Howard V. Hanson
BY
ATTORNEY

April 1, 1930.  H. V. HANSON  1,752,525
HARNESS
Filed Feb. 2, 1929   2 Sheets-Sheet 2

INVENTOR
Howard V. Hanson
BY
ATTORNEY

Patented Apr. 1, 1930

1,752,525

UNITED STATES PATENT OFFICE

HOWARD V. HANSON, OF WALLA WALLA, WASHINGTON

HARNESS

Application filed February 2, 1929. Serial No. 337,086.

This invention relates to harness for draft animals and has as one of its objects to provide a harness, of the field or breechingless harness type, that is adapted to conversion to a single breeching harness or to a double breeching harness, to form therein one harness.

Another object of the invention is to provide a harness that as a field harness is light and consequently easy to put on or off the animal and whose parts are so adjusted and supported on the animal as to prevent excess wear.

A further object of the invention is to provide a harness having a hip pad adapted to be positioned back of the sacrum, on the croup, to distribute a part of the load to that part of the animal, whether that load is the weight of the harness at that point, or a holdback caused by a single or double breeching attached to the original harness.

A further object of the invention is to provide a three purpose harness that by the positioning of the hip pad on the croup, and by its adjustable features, will fit better and be held better in place.

A further object of the invention is to provide a harness that will sell at the usual price; that may be converted to harnesses of other classes, at small additional expense; that will require less time to convert than to change to another harness; and that will thus render decision in the purchase thereof a comparatively simple matter.

A further object of the invention is to provide a three purpose harness that will support the rear end of the traces; that when converted to a single breeching harness will communicate the hold back draft to the croup, and by the aid of the sacrum prevent the draft from slipping forward on the animal; and that when converted to a double breeching harness will support a short breeching fold in a position on the rump of the animal that it cannot bear against its legs, and in a position of cooperation with the hip pad to provide a hold back sling affording considerable bearing surface and better purchase for the animal for heavy work.

With these and other objects that will present themselves as the specifications proceed reference is now had to the accompanying drawings in which Fig. 1 represents a horse in outline and showing the harness as a field harness as applied to the animal;

Figure 1:
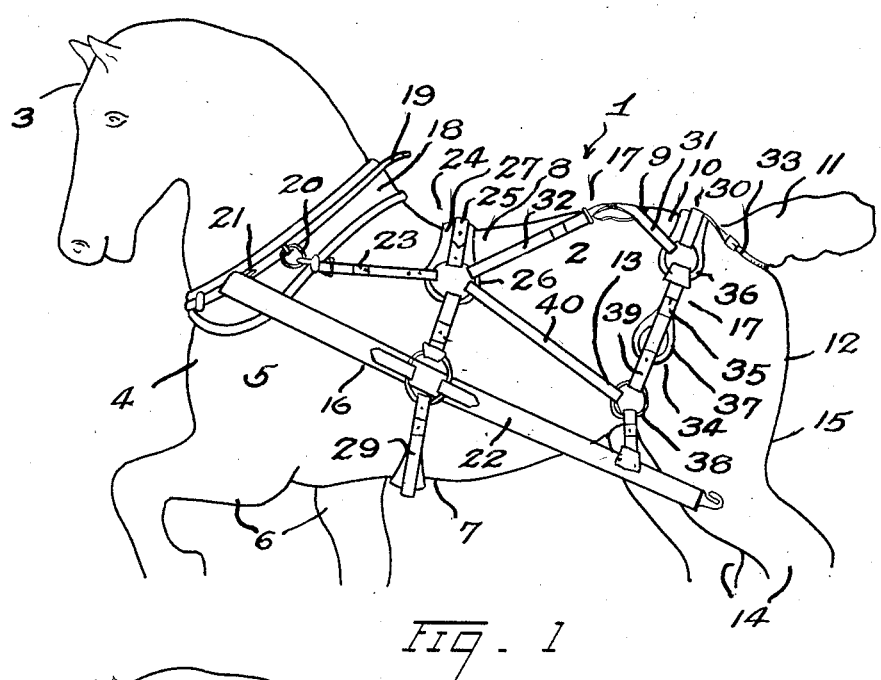

Having reference to the drawings like numerals refer to like parts throughout the several views, and the numeral 1 refers to a horse, the gross anatomy of which, pertaining to this invention, is the body 2, head 3, breast 4, shoulders 5, fore legs 6, belly 7, back 8, sacrum 9, croup 10, tail 11, rump 12, hips 13, hind legs 14, and the back of the hind legs 15.

The invention consists of a harness 16 with which has been incorporated a convertible breeching rigging 17, the harness consisting of a collar 18, and hames 19 adapted to rest upon the shoulders 5 of the animal, as shown, and other parts to be presently described.

The hames have a ring 20 on each side to which the straps of the harness are secured, and loops 21 to which the traces 22 are fastened, the latter extending toward the rear of the animal to be secured to the load (not shown), while the straps referred to consist of shoulder straps 23 which extend rearward to be attached to and secure a back pad 24 in a position relative to the hames 19.

The back pad consists of a back pad strap 25 having a distributing ring 26 at each end and provided with a broad pad 27 attached to the strap and adapted to form a broad bearing surface to contact the animal's back.

The back pad 24 is curved over the back 8, and the distributing rings 26 are engaged by the shoulder straps 23 so that the depending ends of the back pad are secured against longitudinal movement away from the collar 18, thus holding the back pad in position.

Market straps 28 may also be attached to these rings and used to support the intermediate part of the traces 22, and indirectly to support a belly band 29 adapted to pass under the belly 7 of the horse and having its ends attached to the traces by distributing rings or otherwise.

A hip pad 30, of similar construction to the back pad, and simliarly fitting across the animal at its croup 10, adjacent the base of its tail 11, and having downwardly extending members formed integral therewith, is next arranged in the harness and has its depending ends secured to the back pad 24 by cross straps consisting of hip pad straps 31 and back straps 32, preferably crossed to provide a support on the animal's back at the point of crossing each other, with the final point of securement of the hip pad terminating at the hames through the aforementioned shoulder straps 23.

The central or top part of the hip pad may be secured in place by the crupper 33, as shown, but dependence is placed on the sacrum 9 of the animal to prevent movement of this pad forward, this part being the high part over which normally the hip pad would with difficulty be moved.

The hip pad 30 however is positively restrained from movement over the sacrum by a tripurpose member 34 attached to and forming side joints with the depending ends of this pad the lower ends of which members are connected to the traces 22 whereby a downward pull is exerted on the hip pad by the weight of the harness and by the draft incident to this member, and to be explained.

The tripurpose member consists preferably of a side hip strap suspended from the distributing ring 36 of the hip pad and depending is provided at its lower end with a distributing ring which shall be termed a "double-breeching ring" 37 to differentiate this ring from a second distributing ring which shall be termed a "single-breeching ring" 38 and which is suspended below the double-breeching ring by a joint strap, as shown.

As it is essential that the tripurpose member be secured at both ends against longitudinal movement a flank strap 40 is utilized to secure the lower end of this member and this strap it attached to the single-breeching ring and follows a diagonal path to the distributing ring of the back pad whence any draft coming on this member will be communicated to the hames through the shoulder straps, in the identical manner of the cross straps which hold the upper end of this member.

The above mentioned hip pad and tripurpose member, together with the crossed straps and flank straps, and the shoulder straps in their function to hold the tripurpose members to place, constitute a convertible breeching rigging which obviously may be formed integral with the harness, or by slight alterations may be made adjustable as a unit to attach to a harness. It is my preferred intent however to have the rigging form an integral part of the harness.

Let it be also understood that it is not my intent to limit the extent of the tripurpose members as these naturally may include the hip pad, as when the tripurpose member is considered as extending from one single-breeching ring to the opposite single-breeching ring, when considered in the singular however this member may be considered as extending from the single-breeching ring to the hip pad.

As the hip pad is disposed back of the line of the hips 13, on the fleshy part of the animal, the tripurpose member will assume a position avoiding the hips of the animal forming a gentle curve to the single-breeching ring, to be secured in that position by the flank strap and the lazy strap by which the single-breeching ring is secured to the traces.

The harness described above constitutes a light or field harness, and for the purpose of converting the harness to a single breeching what will be termed a "single breeching" must be added to the harness, which single breeching consists of the following:

A pole strap 41 or martingale adapted to attach to a neckyoke (not shown) and extending rearward, its front portion being upheld by a collar strap 42 in turn attached to the collar (in the usual manner), and its rear end being supported by the belly band 29 and terminating in a loop to be secured to side straps 43.

The side straps consist of a pair of straps which unitedly join the pole strap beneath the belly of the animal, and which curve upward and encircle the belly until they intersect the single-breeching rings 38, to which the side straps are secured by snaps or other means.

It will now be noted that the single breeching part of the harness, by attaching to the single-breeching ring, will provide a continuous line of draft from the neckyoke to the hip pad 30 at the top of the harness and located on the croup. In other words a single breeching may be applied to the field harness by merely attaching the usual single breeching to the harness designed as above outlined and by so doing convert a field harness into a single breeching harness that may be used to hold back heavier loads than the usual harness of this type, as the draft is directed in a line with the double breeching rings and the side joints to the croup which substantially resists the draft, as against side straps brought to the top of the sacrum and secured in that unstable position by the crupper, an arrangement more or less uncomfortable to the animal.

For the purpose of converting the now single breeching harness to a double breeching harness a breeching fold A is added to the double-breeching rings of the tripurpose member in a manner to extend around the rump of the animal.

The breeching fold consists of a fold of leather, forming a pad B to contact the animal, strengthened by a rump strap C, the latter being arranged to buckle to the double-breeching rings or may obviously be equipped with snaps if desired.

The double-breeching ring it will now be observed is positioned on the tripurpose member back of the hips and attached to a point directly opposite the buttock or rump, and that the parts have a relative position with the hip pad well back (at the base of the tail), bringing the double-breeching ring also well back, thereby necessitating a short breeching fold so positioned and hinged to the double-breeching ring that it cannot fall down to the back of the hind legs 15.

By this means the double breeching harness becomes adapted for unusually heavy duty, more particularly so as, it will be clearly observed, this arrangement of the fold and the hip pad now constitute a sling in which the animal could sit when exerting his maximum strength to hold back an unusually heavy load.

Figures 4, 5:
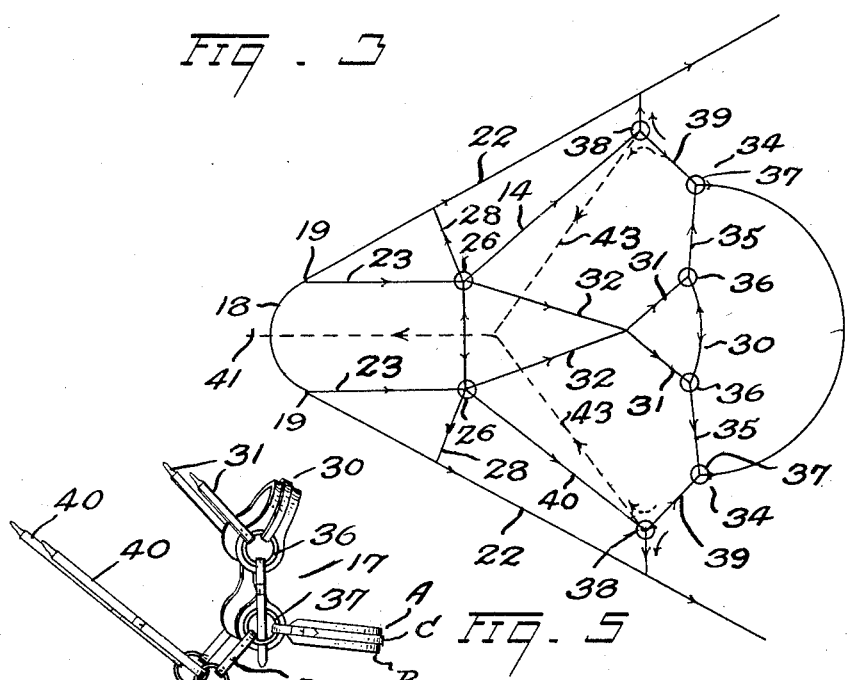
Fig. 4 is a perspective view of the convertible breeching rigging.
Fig. 5 is a diagrammatic layout representing the harness and showing the direction of the forces.

It will be further observed that the harness, with this arrangement of the breeching rigging, presents a fabric of web-like structure, as will be observed by referring to Fig. 5.

Figure 3:
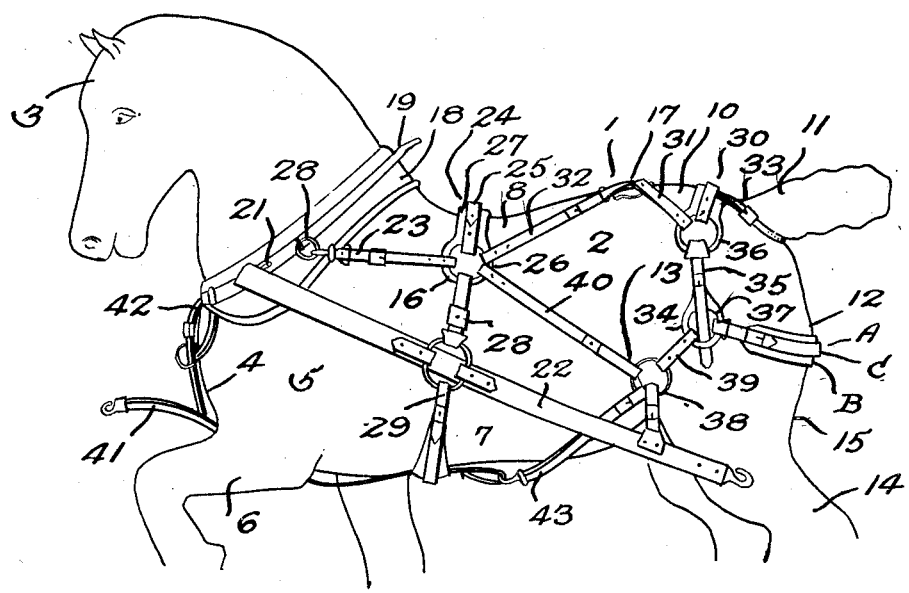
Fig. 3 is a similar view showing the harness converted to a double breeching harness.

In this figure the numbered lines represent straps and parts of the harness like numbered, and the arrow points indicate the direction of the forces, which directions should be considered with reference to Fig. 3.

By referring to these arrow points it will be seen that a force exerted in the direction of the arrow points on the breeching fold A will exert a pull on the side hip straps 35, this in turn exerting a pull on the hip pad 30 in two directions, thence the pull follows the cross straps 31 and 32 respectively caused by the efforts of the side hip straps 35 to straighten out the triangle formed by the hip pad 30 and the hip pad straps 31, thence the back straps 32 convey the pull to the back pad 24. Around the other way the pull conveyed through the joint strap 39 and flank strap 40 to the distributing ring of the back pad 24, thence this pull and the pull of the back straps go to the hames 19.

In a single breeching harness the pull is as shown by the broken lines and the dotted arrows, showing a change of direction of the force in the joint strap only.

Even when the harness is converted back to a field harness, and the pull is all on the traces, the only change is that just mentioned, in the joint straps, as indicated by the curved solid arrows.

This effect is caused by a combination of means i. e., the angular intersections, having certain of the members secured or supported as the trace, etc.; and in addition the angular arrangement of the parts provide for tightening up of the web on the animal under load producing a snug fitting harness in either case.

In use, it is obvious from the above that the rigging makes available out of a field harness, a single breeching harness, or a double breeching harness, as above explained, and that these harnesses become available by the additional expense only, of the single breeching and the breeching fold.

Figure 2:
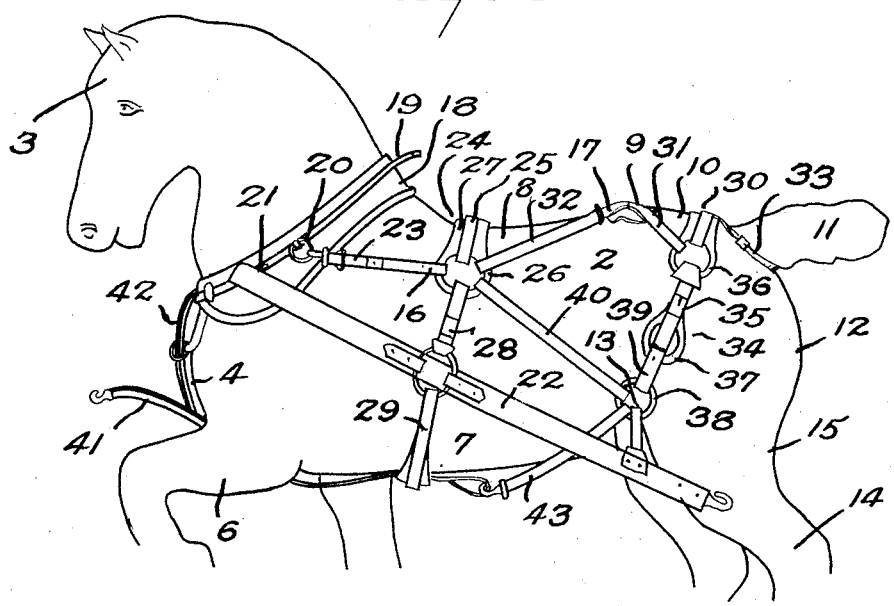
Fig. 2 is a similar view to Fig. 1 showing a like harness converted to a single breeching harness.

In a field harness the rear end of the traces are relatively low, approximately opposite the hock of the animal, for use on implements of low design, while in breeching harnesses the traces are usually higher to connect with wheeled vehicles, such vehicles requiring the breeching, and this change of the traces is accomplished by making the lazy strap detachable from the single breeching ring and snapping it into the double breeching ring. Now, by reference to Figs. 2 and 3 it is obvious that this change is independent of the single breeching ring and hence the single breeching will remain uneffected thereby.

Having thus described my invention, I claim:

1. In a harness for draft animals, including a collar and traces attached thereto, a tripurpose member forming a part of a field harness and providing to convert said harness into a single or a double breeching harness, and consisting in combination of a hip pad provided with means to form side joints, and adapted to rest across the croup of the animal, a longitudinally movable double breeching ring suspended from each of said joints and positioned to avoid the hips, and adapted to receive a breeching fold in a manner to form with the hip pad a sling, rigidly positioned single breeching rings suspended from the double breeching rings and positioned normally in line with said double breeching rings and said side joints, and adapted to receive a single breeching in a manner to communicate the load directly to the croup, and providing means cooperable with the single and double breeching rings to support said traces according to the respective harness arrangements.

2. In a harness for draft animals, including a collar and traces attached thereto, a tripurpose member forming part of a field harness and providing to convert said harness into a single or a double breeching harness, and consisting in combination of a hip pad adapted to rest across the croup of the animal and provided with downwardly extending members formed integral therewith, said members forming means to provide side joints on each side of the animal, means to secure the extension members against longitudinal movement, side hip straps suspended from said members and completing the side joints therewith, and terminating in longitudinally movable double breeching rings positioned to normally rest on the fleshy part of the animal, back of and avoiding the hips, and adapted to detachably receive a breeching fold disposed to provide with said hip pad a sling, depending joint straps movably suspended from the double breeching rings, and provided on their lower ends with single breeching rings, and adapted to receive a single breeching in a manner to communicate the load thereof directly to the croup, means to secure said single breeching rings against longitudinal movement, and means to support the traces from the single breeching rings or the double breeching rings, in the field or breeching harness respectively, without affecting the single breeching.

In testimony whereof I have affixed my signature.

HOWARD V. HANSON.